United States Patent
Wang et al.

(10) Patent No.: US 12,035,403 B1
(45) Date of Patent: Jul. 9, 2024

(54) COMMUNICATION METHOD AND APPARATUS, TERMINAL, AND COMPUTER-READABLE STORAGE MEDIUM

(71) Applicant: SHANGHAI TUGE DATA TECHNOLOGY CO., LTD, Shanghai (CN)

(72) Inventors: Kaihang Wang, Shanghai (CN); Hao Zhou, Shanghai (CN)

(73) Assignee: SHANGHAI TUGE DATA TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 18/530,254

(22) Filed: Dec. 6, 2023

Related U.S. Application Data

(63) Continuation of application No. PCT/CN2023/093803, filed on May 12, 2023.

(30) Foreign Application Priority Data

Feb. 24, 2023 (CN) .......................... 202310159091.2

(51) Int. Cl.
| | |
|---|---|
| H04W 8/02 | (2009.01) |
| H04W 4/02 | (2018.01) |
| H04W 8/18 | (2009.01) |
| H04W 48/02 | (2009.01) |
| H04W 60/06 | (2009.01) |
| H04W 76/18 | (2018.01) |

(52) U.S. Cl.
CPC .......... *H04W 76/18* (2018.02); *H04W 8/183* (2013.01); *H04W 48/02* (2013.01); *H04W 60/06* (2013.01)

(58) Field of Classification Search
None
See application file for complete search history.

(56) References Cited

U.S. PATENT DOCUMENTS

| | | | |
|---|---|---|---|
| 2015/0099562 | A1 | 4/2015 | Xiong |
| 2017/0048206 | A1 | 2/2017 | Sui |
| 2021/0176623 | A1 | 6/2021 | Zhu et al. |

FOREIGN PATENT DOCUMENTS

| | | | | |
|---|---|---|---|---|
| CN | 104883658 | A | | 9/2015 |
| CN | 105554718 | A | | 5/2016 |
| CN | 112367625 | A | | 2/2021 |
| CN | 107734492 | B | * | 5/2021 ............ H04W 8/183 |

(Continued)

*Primary Examiner* — Gary Lafontant
(74) *Attorney, Agent, or Firm* — Bayramoglu Law Offices LLC

(57) ABSTRACT

A method includes: establishing a connection with a virtual SIM card server in a first network using a global virtual SIM card of a terminal to acquire a regional virtual SIM card from the virtual SIM card server, wherein the regional virtual SIM card is configured to allow the terminal to access a second network; determining whether the global virtual SIM card of the terminal is in conflict; updating a count of conflicts in response to determining that the global virtual SIM card of the terminal is in conflict; and upon elapse of a wait period, replacing the global virtual SIM card of the terminal with a new one to acquire the regional virtual SIM card, wherein the wait period is determined according to the count of conflicts and an identifier of the terminal.

18 Claims, 2 Drawing Sheets

(56) References Cited

FOREIGN PATENT DOCUMENTS

| | | | | |
|---|---|---|---|---|
| CN | 113055952 | A | 6/2021 | |
| CN | 114175702 | A * | 3/2022 | ............ H04W 24/08 |
| CN | 114867002 | A | 8/2022 | |
| CN | 115942430 | A | 4/2023 | |
| WO | 2017181627 | A1 | 10/2017 | |
| WO | 2018010640 | A1 | 1/2018 | |

* cited by examiner

COMMUNICATION METHOD AND APPARATUS, TERMINAL, AND COMPUTER-READABLE STORAGE MEDIUM

CROSS REFERENCE TO THE RELATED APPLICATIONS

This application is a continuation application of International Application No. PCT/CN2023/093803, filed on May 12, 2023, which is based upon and claims priority to Chinese Patent Application No. 202310159091.2, filed on Feb. 24, 2023, the entire contents of which are incorporated herein by reference.

TECHNICAL FIELD

Embodiments of the present disclosure relate to the technical field of information communications, and in particular, relate to a communication method, a communication apparatus, and a computer-readable storage medium.

BACKGROUND

In mobile communications, subscriber identity module (SIM) cards record important information and data of users, for example, international mobile subscriber identities (IMSIs), encryption passwords, and the like. When a SIM card is inserted into a terminal device, the network authenticates an identification of a user, and encrypts voice information and data content involved in user's call.

With the advancement of technology, virtual SIM cards (vSIMs), also referred to as virtual cards, have been extensively used in mobile terminals. A vSIM card, without a physical SIM card, implements communication totally depending on software and hardware of a communication module of the mobile terminal. The communication module having the vSIM function, used with bottom-layer software specifically designed for vSIM, implements encryption of stored data (IMSI, KI, and the like). With the vSIM card, in logging into the network, authentication, and communication, corresponding logic is automatically processed, such that stable and reliable communication experience is achieved without a physical SIM card. However, in the technical solution of the related art, conflicts of the virtual SIM card are caused in registration of the virtual SIM card.

SUMMARY

Embodiments of the present disclosure provide a communication method, a communication apparatus, a terminal, and a computer-readable storage medium. With the technical solutions according to the embodiments of the present disclosure, in the case that the terminal is subjected to a conflict of the global virtual SIM card, the probability that a plurality of terminals initiate registration and connection using the same global virtual SIM card at an approximate instant is lowered, the conflicts in acquiring the regional virtual SIM card by the terminals are relieved, and thus user experience is enhanced.

In one aspect, a communication method is provided. The method includes: establishing a connection with a virtual SIM card server in a first network using a global virtual SIM card of a terminal to acquire a regional virtual SIM card from the virtual SIM card server, wherein the regional virtual SIM card is configured to allow the terminal to access a second network; determining whether the global virtual SIM card of the terminal is in conflict; updating a count of conflicts in response to determining that the global virtual SIM card of the terminal is in conflict; and upon elapse of a wait period, replacing the global virtual SIM card of the terminal with a new one to acquire the regional virtual SIM card, wherein the wait period is determined according to the count of conflicts and an identifier of the terminal.

In response to replacing the global virtual SIM card of the terminal with a new one to acquire the regional virtual SIM card, the second network is accessed using the acquired regional virtual SIM card.

In some embodiments, determining whether the global virtual SIM card of the terminal is in conflict includes: determining that the global virtual SIM card of the terminal is in conflict in response to a failure to establish the connection with the virtual SIM card server using the global virtual SIM card for consecutive N times and the global virtual SIM card used each time being replaced, wherein N is a conflict threshold.

It is determined that establishment of the connection with the virtual SIM card server using the current global virtual SIM card fails in response to receiving a reject message from the first network or receiving no response message from the first network in due time.

The reject message includes a reject reason, wherein the rejection reason includes an implicit detach rejection.

In some embodiments, the wait period is UE_NUM× registration expiration time+RAND (1, the registration expiration time), or (9-UE_NUM)×registration expiration time+RAND (1, the registration expiration time).

UE_NUM is a mantissa of the identifier of the terminal with a value of an integer from 0 to 9, RAND (1, the registration expiration time) indicates that a random number is taken between 1 and the registration expiration time, and a wait period corresponding to an odd number as the count of conflicts is different from a wait period corresponding to an even number as the count of conflicts.

The identifier of the terminal is an international mobile subscriber identity (IMEI) or a serial number (SN) of the terminal.

In a second aspect, a communication apparatus is provided. The apparatus has a function of performing the methods according to the first aspect and any possible implementation of the first aspect. The functions may be implemented by hardware, or may be implemented by performing corresponding software by hardware. The hardware or software includes one or a plurality of modules corresponding to the above functions. Exemplarily, the apparatus includes: a regional virtual SIM card acquiring module, configured to establish a connection with a virtual SIM card server in a first network using a global virtual SIM card of a terminal to acquire a regional virtual SIM card from the virtual SIM card server, wherein the regional virtual SIM card is configured to allow the terminal to access a second network; a conflict detecting module, configured to determine whether the global virtual SIM card of the terminal is in conflict; a count updating module, configured to update a count of conflicts in response to determining that the global virtual SIM card of the terminal is in conflict; and a conflict processing module, configured to, upon elapse of a wait period, replace the global virtual SIM card of the terminal with a new one to acquire the regional virtual SIM card, wherein the wait period is determined according to the count of conflicts and an identifier of the terminal.

In some embodiments, the communication apparatus according to the second aspect may be a terminal.

In a third aspect, a communication apparatus is provided. The apparatus includes a memory and a processor. The memory is configured to store one or more computer programs. The processor, when loading and running the one or more computer programs from the memory, causes the communication apparatus to perform the methods according to the first aspect and any possible implementation of the first aspect.

In some embodiments, the communication apparatus according to the second aspect may be a terminal.

In a fourth aspect, a terminal is provided. The terminal includes a transceiver, and the communication apparatus according to the second aspect and any possible implementation of the second aspect or the communication apparatus according to the third aspect and any possible implementation of the third aspect.

In a fifth aspect, a computer-readable storage medium is provided. The computer-readable storage medium stores one or more computer instructions. The one or more computer instructions, when loaded and executed on a computer, cause the computer to perform the method according to the first aspect and any possible implementation of the first aspect.

In a sixth aspect, a computer program product is provided. The computer program product includes one or more computer program codes. The one or more computer program codes, when loaded and executed on a computer, cause the computer to perform the methods according to the first aspect and any possible implementation of the first aspect.

With the communication method, the communication apparatus, the terminal, and the computer-readable storage medium according to the embodiments of the present disclosure, in the case that the terminal is subjected to a conflict of the global virtual SIM card, by randomly distributing reattempts to acquire the regional virtual SIM card of the terminal, the probability that a plurality of terminals initiate registration and connection using the same global virtual SIM card at an approximate instant is lowered, and the conflicts in acquiring the regional virtual SIM card by the terminals are relieved. In this way, a delay of service resumption is shortened, and user experience is enhanced.

DETAILED DESCRIPTION OF THE EMBODIMENTS

Figure 1:
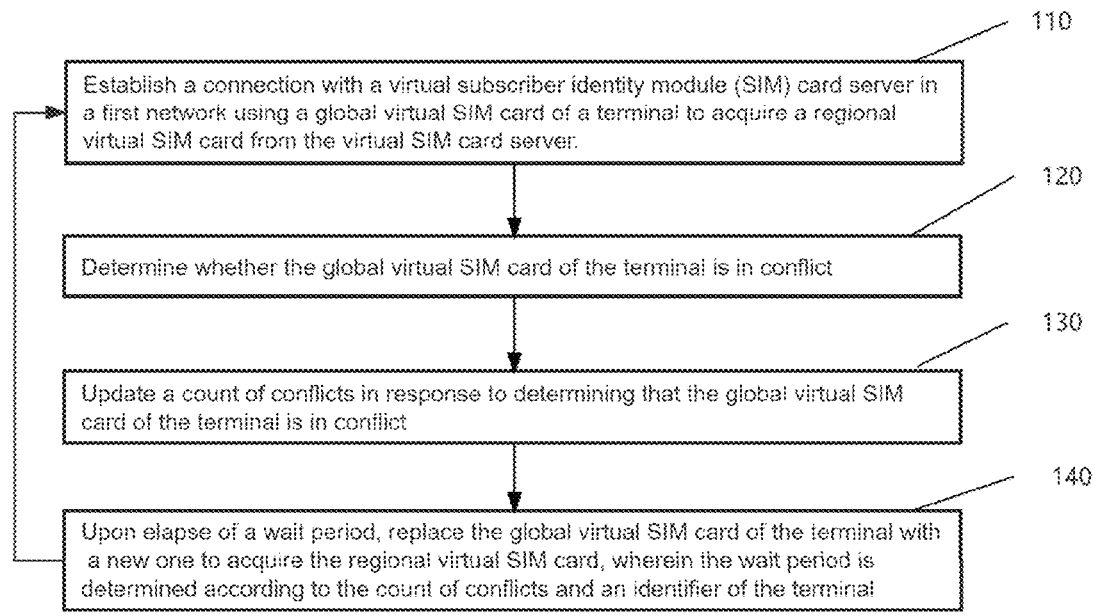
FIG. 1 is a schematic flowchart of a communication method according to an embodiment of the present disclosure.

The technical solutions of the present disclosure are described in detail with reference to some embodiments of the present disclosure. It should be noted that the embodiments described herein are merely exemplary ones, but are not all the embodiments of the present disclosure. Based on the embodiments of the present disclosure, all other embodiments derived by persons of ordinary skill in the art without any creative efforts shall fall within the protection scope of the present disclosure.

In addition, terms of "first," "second," "third," "fourth," and the like are only used for description, but shall not be understood as indication or implication of relative importance or implicit indication of the number of the specific technical features. Therefore, the features proceeded by "first," "second," "third," and "fourth," may explicitly or implicitly include one or more of these features.

The communication method according to the embodiments of the present disclosure is applicable to terminals supporting various communication modes, for example, a third generation (3G) mobile communication system, a fourth generation (4G) mobile communication system, a fifth generation (5G) mobile communication system, or any subsequently-involved communication system. The terminal includes, but is not limited to: a user equipment (UE), a subscriber unit, a subscriber station, a mobile station, a mobile, a remote station, a remote terminal device, a mobile terminal device, a user terminal device, a terminal device, a wireless communications device, a user agent, a user apparatus, a cellular phone, a cordless phone, a Session Initiation Protocol (SIP) phone, a wireless local loop (WLL) station, a personal digital assistant (PDA), a handheld device having a wireless communication function, a computing device, a processing device connected to a wireless modem, a vehicle-mounted device, a wearable device, a terminal device in the Internet of Things, a household appliance, a virtual reality device, a terminal device in a future 5G network, a terminal device in a future evolved public land mobile network (PLMN), and the like. In the embodiments of the present disclosure, description is given using a terminal as an example, and sometimes, a terminal device, a subscriber device, or the like is alternately used for description.

Hereinafter, terms used in the embodiments of the present disclosure are introduced.

A global virtual SIM card is also referred to as a global roaming local virtual SIM card, or referred to as a local virtual SIM card, a local roaming virtual SIM card, a global roaming virtual SIM card, an activation soft card, a roaming virtual SIM card, or the like. The global virtual SIM card is used for global communication network roaming. The global virtual SIM card is pre-configured to stored locally in the terminal, and is only used for downloading a regional virtual SIM card upon roaming registration for the terminal to implement local access in the current region. A plurality of devices/terminals may share the same batch of global virtual SIM cards.

A regional virtual SIM card is also referred to as a remote virtual SIM card, and is issued by a virtual SIM card server for storing local information of a specified region. The regional virtual SIM card may implement roaming in the specified region.

The inventors of the present disclosure have identified the cause to the conflicts in the related art: The terminal using the virtual SIM card, upon power on, randomly selects one of pre-configured global virtual SIM cards for registration, and establishes a network connection with a regional virtual SIM card server to acquire a regional virtual SIM card and downloads the acquired regional virtual SIM card to the terminal locally via the regional virtual SIM card server. The terminal may access the network servicing the current region using the regional virtual SIM card, and roaming is implemented for the terminal. Generally, a plurality of terminals may be pre-configured with a batch of identical global virtual SIM cards.

Where the regional virtual SIM card is abnormal, for example, the terminal fails to use data services for a long period of time, the terminal may fall back to a state of acquiring the regional virtual SIM card. That is, the terminal may re-establish a connection with the regional virtual SIM card server using the global virtual SIM card to acquire another regional virtual SIM card. Where the network accessed by the regional virtual SIM card is faulty for a long period of time, the terminal accessing the network using the regional virtual SIM card falls back to the state of acquiring the regional virtual SIM card. Since the global virtual SIM card and the terminal are not in 1:1 pre-configuration, but typically in 1:100 or even smaller ratio pre-configuration, batchwise fallback may result in that the plurality of terminals share the same global virtual SIM card for registration. Since these terminals do not exchange information, it is probable that registration is initiated using the same global virtual SIM card at approximate time nodes, the terminal initiating registration later may cause the network to release the terminal initiating registration previously, and the released terminal may continue to initiate registration which affects the terminal that is in a registration process. In this way, these terminals may not resume in a short period of time, and thus the global virtual SIM card is in conflict and fails to be used by any of the terminals.

As illustrated in FIG. 1, a communication method is provided. The communication method is applicable to a communication apparatus deployed in a terminal using a virtual SIM card, and relieves conflicts of a global virtual SIM card for the terminal using the virtual SIM card. The communication method includes the following steps.

In step 110, a connection is established with a virtual SIM card server in a first network using a global virtual SIM card of a terminal to acquire a regional virtual SIM card from the virtual SIM card server, wherein the regional virtual SIM card is configured to allow the terminal to access a second network.

Upon power on, to acquire the regional virtual SIM card, the terminal randomly selects a global virtual SIM card as the current global virtual SIM card for registration in the first network, such that the terminal establishes a connection with the virtual SIM card server upon successful registration, and acquires the regional virtual SIM card from the virtual SIM card server and downloads the regional virtual SIM card to the terminal. This stage is referred to as an acquisition stage of the regional virtual SIM card.

The first network may be a communication network provided by a home operator or a roaming operator of the current global virtual SIM card.

The virtual SIM card server provides, according to the region in which the terminal is currently located, a regional virtual SIM card recording local information of the region. The terminal accesses the second network using the regional virtual SIM card, and uses voice or data services provided by the second network.

The second network may be a communication network provided by an operator in the region in which the terminal is currently located. The regional virtual SIM card may be a virtual SIM card belonging to the operator.

It may be understood that the first network and the second network may be a communication network provided by the same operator, or communication networks provided by different operators.

Where the regional virtual SIM card is abnormal, a duration where an abnormality is present in accessing the second network using the regional virtual SIM card of the terminal exceeds a predetermined time period. For example, the terminal fails to use data services for a long period of time, the terminal may fall back to a stage of acquiring the regional virtual SIM card. That is, the terminal may re-establish a connection with the virtual SIM card server using the global virtual SIM card to acquire another regional virtual SIM card.

In step 120, whether the global virtual SIM card of the terminal is in conflict is determined.

In the case that the terminal successfully establishes the connection with the virtual SIM card server, the terminal may acquire and download the regional virtual SIM card assigned by the virtual SIM card server. In the case that the registration using the current global virtual SIM card of the terminal fails, whether the global virtual SIM card of the terminal is in conflict needs to be determined.

Where the network accessed by the regional virtual SIM card is faulty for a long period of time, a plurality of terminals using the regional virtual SIM card for this region batchwise fall back to the stage of acquiring the regional virtual SIM card at approximate time nodes. That is, at the approximate instant, a plurality of terminals may perform step 110. Since the global virtual SIM card and the terminal are not in 1:1 pre-configuration, batchwise fallback may result in that the plurality of terminals share the same global virtual SIM card for registration. In the terminals using the same global virtual SIM card for registration and connection, the terminal in later registration may interrupt registration or connection of the terminal in previous registration. When using data, the terminal in previous registration receives an implicit detach rejection from the first network of the operator since the data is deleted from the operator side. Afterwards, the terminal re-attempts registration in response to the rejection, which thus interrupts registration of the terminal in previous registration. This causes an endless loop of mutual conflicts.

In addition, in the case that a large number of terminals use the same global virtual SIM card, the network side may detect such exception. Upon initiation of registration, the network side does not respond to the terminals, and thus the terminals fail to complete registration.

It is determined that the global virtual SIM card of the terminal is in conflict and step 130 is performed in response to a failure to establish the connection with the virtual SIM card server using the global virtual SIM card for consecutive N times and the global virtual SIM card used each time being replaced, wherein N is a conflict threshold.

It is determined that establishment of the connection with the virtual SIM card server using the global virtual SIM card fails in response to receiving a reject message from the first network or receiving no response message in due time. The reject message includes a reject reason, wherein the rejection reason includes an implicit detach rejection.

Hereinafter, description is given using the conflict threshold N=2 as an example. For example, the regional virtual SIM card of the terminal is abnormal, for example, the terminal fails to use data services for a long period of time, the terminal may fall back to the stage of acquiring the regional virtual SIM card, and step 110 is performed to initiate registration to the first network using the currently used global virtual SIM card, to establish the connection with the virtual SIM card server. In the case that the reject message including the implicit detach rejection as the reject reason is received from the first network, or no response message is received from the first network in due time, the current global virtual SIM card is replaced, and step 110 is performed again to initiate registration to the first network. In the case that registration of the terminal is accepted by the first network and the connection is successfully established with the virtual SIM card server, the regional virtual SIM card assigned by the virtual SIM card server may be acquired and downloaded, that is, no conflict of the global virtual SIM card occurs. In the case that the reject message including the implicit detach rejection as the reject reason is still received from the first network, or still no response message is received from the first network in due time, establishment of the connection with the virtual SIM card server using the global virtual SIM card fails at two consecutive times, and in this case, it may be considered that conflicts of global virtual SIM card occur, and step 130 is performed. It may be understood that described above are merely examples for illustration, and set no limitation. The conflict threshold N may be set to 3, 4, or an even greater value according to actual needs.

In step 130, a count of conflicts is updated in response to determining that the global virtual SIM card of the terminal is in conflict.

Upon determination that the global virtual SIM card of the terminal is in conflict, the count of conflicts is updated. For example, the count of conflicts may be added by 1, or perturbation is performed by random addition and subtraction.

In step 140, upon elapse of a wait period, the global virtual SIM card of the terminal is replaced with a new one to acquire the regional virtual SIM card, wherein the wait period is determined according to the count of conflicts and an identifier of the terminal.

To relieve the conflicts of the global virtual SIM card in acquiring the regional virtual SIM card by a plurality of terminals, wait periods of re-acquiring the regional virtual SIM card by these terminals may be staggered, such that the probability that the plurality of terminals using the same global virtual SIM card initiate registration and connection at approximate instants, and a synchronization conflict state caused by consistent algorithms is avoided.

The wait periods for acquiring the regional virtual SIM card by the terminals may be determined based on the count of conflicts and identifiers of the terminals. In a possible implementation, the wait period may be UE_NUM×registration expiration time+RAND (1, the registration expiration time), or (9-UE_NUM)×registration expiration time+RAND (1, the registration expiration time).

UE_NUM is a mantissa of the identifier of the terminal with a value of an integer from 0 to 9, RAND (1, the registration expiration time) indicates that a random number is taken between 1 and the registration expiration time, and a wait period corresponding to an odd number as the count of conflicts is different from a wait period corresponding to an even number as the count of conflicts. The identifier of the terminal is an international mobile subscriber identity (IMEI) or a serial number (SN) of the terminal.

For example, when the count of conflicts of the terminal is an odd number, the wait period is UE_NUM×registration expiration time+RAND (1, the registration expiration time), or when the count of conflicts of the terminal is an even number, the wait period is (9-UE_NUM)×registration expiration time+RAND (1, the registration expiration time). For example, the mantissa of the identifier of the terminal is 2, and the registration expiration time is 5 seconds. In this case, the count of conflicts is 1 in case of a first global virtual SIM card conflict, and the wait period is 2×5+RAND (1, 5) seconds; and the count of conflicts is 2 in case of a second global virtual SIM card conflict, and the wait period is 7×5+RAND (1, 5) seconds. It is apparent that each time a conflict occurs, the wait period is not the same.

Alternatively, when the count of conflicts of the terminal is an odd number, the wait period is (9-UE_NUM)×registration expiration time+RAND (1, the registration expiration time), or when the count of conflicts of the terminal is an even number, the wait period is UE_NUM×registration expiration time+RAND (1, the registration expiration time). The above are all examples, and the wait period is not limited thereto.

Upon the wait period, the global virtual SIM card of the terminal is replaced to acquire the regional virtual SIM card. That is, the process continues from step 110 until the regional virtual SIM card is acquired or acquisition of the regional virtual SIM card is stopped.

The acquisition of the regional virtual SIM card is stopped in response to power off of the terminal, or reach of a maximum count of times for acquiring the regional virtual SIM card.

With the communication method according to the embodiments of the present disclosure, in the case that the terminal is subjected to a conflict of the global virtual SIM card, by randomly distributing reattempts to acquire the regional virtual SIM card of the terminal, the probability that a plurality of terminals initiate registration and connection using the same global virtual SIM card at an approximate instant is lowered, and the conflicts in acquiring the regional virtual SIM card by the terminals are relieved. In this way, a delay of service resumption is shortened, and user experience is enhanced.

Figure 2:
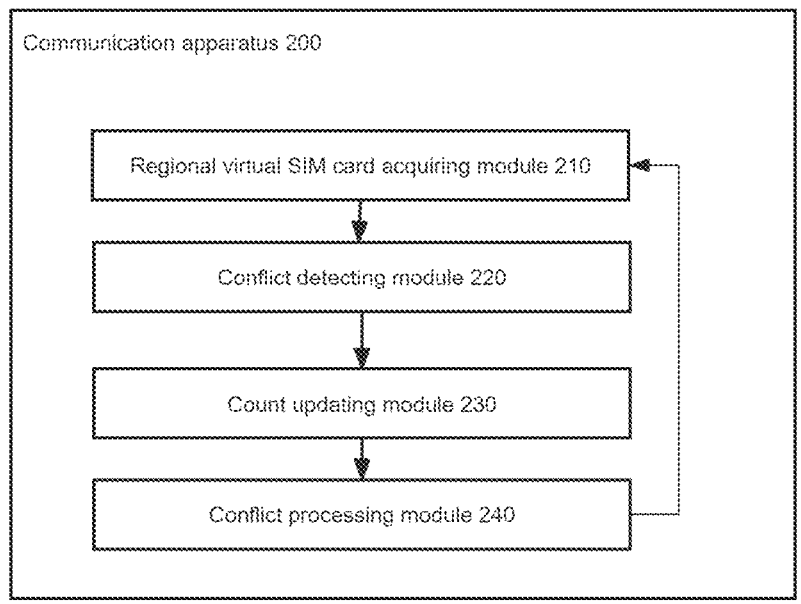
FIG. 2 is a schematic structural diagram of a communication apparatus according to an embodiment of the present disclosure.

FIG. 2 is a schematic structural diagram of a communication apparatus 200 according to an embodiment of the present disclosure. The communication apparatus may be configured to practice the above method embodiments. For details, reference may be made to the description of the method embodiments, which are not described herein any further. The communication apparatus 200 may include:

a regional virtual SIM card acquiring module 210, configured to establish a connection with a virtual SIM card server in a first network using a global virtual SIM card of a terminal to acquire a regional virtual SIM card from the virtual SIM card server, wherein the regional virtual SIM card is configured to allow the terminal to access a second network;

a conflict detecting module 220, configured to determine whether the global virtual SIM card of the terminal is in conflict;

a count updating module 230, configured to update a count of conflicts in response to determining that the global virtual SIM card of the terminal is in conflict; and a conflict processing module 240, configured to, upon elapse of a wait period, replace the global virtual SIM card of the terminal with a new one to acquire the regional virtual SIM card, wherein the wait period is determined according to the count of conflicts and an identifier of the terminal.

The communication apparatus according to the embodiments of the present disclosure is capable of practicing the above method embodiments. The communication apparatus observes the same principles and achieves the same technical effects, which are not described herein any further.

It should be noted that the communication apparatus 200 may be practiced in the form of functional modules. The "modules" herein may be implemented by software and/or hardware, which is not limited herein.

For example, the "modules" may be software programs, hardware circuits, or a combination thereof capable of implementing the above functions. The hardware circuits may include an application-specific integrated circuit (ASIC), an electronic circuit, a processor (for example, a shared processor, a dedicated processor, a group processor, or the like) for performing one or a plurality of software or firmware programs and a memory, a merged logic circuit, and/or any suitable component supporting the functions.

Therefore, various exemplary modules described with reference to the embodiments of the present disclosure given herein may be practiced in the form of electronic hardware or a combination of computer software and electronic hardware. Whether such functions are implemented in the form of software or hardware depends on the specific application and the design restrictions applied to the entire system. Professional technical personnels may implement the described functions by using different methods for each specific application. However, such implementation shall not be deemed as going beyond the scope of the present disclosure.

Figure 3:
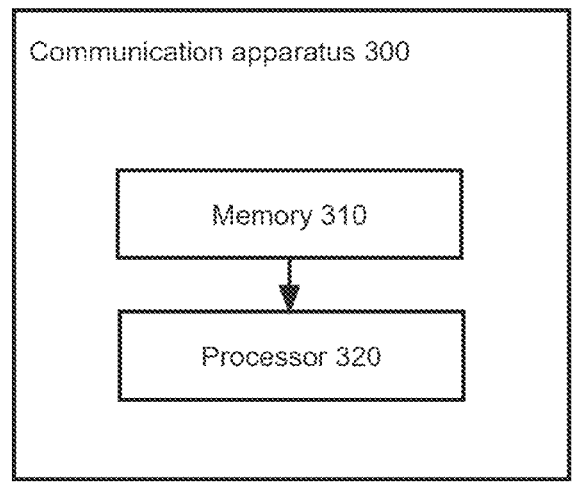
FIG. 3 is a schematic structural diagram of a communication apparatus according to an embodiment of the present disclosure.

FIG. 3 is a schematic structural diagram of a communication apparatus according to an embodiment of the present disclosure. The communication apparatus 300 as illustrated in FIG. 3 includes a memory 310 and a processor 320.

The memory 310 may be a read-only memory (ROM), a static storage device, a dynamic storage device, or a random-access memory (RAM). The memory 310 may store one or more programs. The one or more programs, when loaded and run by the processor 320, cause the processor 320 to perform the steps in the communication methods according to the embodiments of the present disclosure, for example, the steps as illustrated in FIG. 1.

The processor 320 may be a central processing unit (CPU), a micro-processor, an application-specific integrated circuit (ASIC), a graphics processing unit (GPU), or one or more integrated circuits, for loading and running one or more related programs to perform the communication methods according to the embodiments of the present disclosure.

The processor 320 may be an integrated circuit chip, and has capabilities of processing signals. During the implementation, various steps in the communication method of the present disclosure may be performed by means of an integrated logic circuit in the processor 320 or by means of instructions.

The processor 320 may be a general processor, a digital signal processor (DSP), an application specific integrated circuit (ASIC), a field programmable gate array (FPGA) or another programmable logic device, a discrete gate or transistor logic device, or a discrete hardware component. The processor 320 is capable of implementing or performing the methods, steps and logic block diagrams in the embodiments of the present disclosure. The general-purpose processor may be a microprocessor or any customary processor or the like. The steps in the method according to the embodiments of the present disclosure may be directly reflected as being practiced by a decoding processor, or practiced by a software module plus hardware in the decoding processor. The software module may be located in a random memory, a flash memory, a read-only memory, a programmable read-only memory, an electrically erasable programmable memory, a register or the like storage medium commonly known in the art. The storage medium is included in the memory 310. The processor 320 reads the information stored in the memory 310 and implements the functions of the modules in the communication apparatus as illustrated in FIG. 1, or performs the communication method as illustrated in FIG. 1 in combination with the hardware thereof.

It should be noted that although the memory and the processor of the communication apparatus 300 are specifically illustrated, a person skilled in the art would understand that the communication apparatus 300 may further include other devices necessary for normal operating of the apparatus. In addition, a person skilled in the art would understand, according to actual needs, that the communication apparatus 300 may further include hardware devices for implementing other additional functions. Further, a person skilled in the art would understand that the communication apparatus 300 may only include the devices mandatory for practicing the embodiments of the present disclosure, instead of including all the devices as illustrated in FIG. 3.

Figure 4:
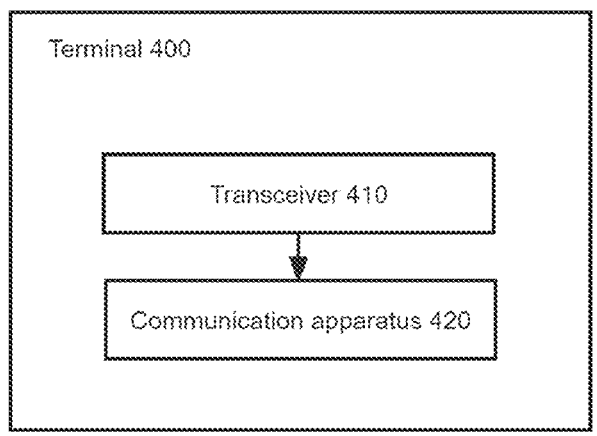
FIG. 4 is a schematic structural diagram of a terminal according to an embodiment of the present disclosure.

FIG. 4 is a schematic structural diagram of a terminal according to an embodiment of the present disclosure. As illustrated in FIG. 4, the terminal includes a transceiver 410 and a communication apparatus 420. The communication apparatus 420 may be the communication apparatus 200 as illustrated in FIG. 2, or may be the communication apparatus 300 as illustrated in FIG. 3. The transceiver 410 is configured to receive or transmit signals. The communication apparatus 420 is configured to perform the methods according to the above embodiments.

A person skilled in the art may envisage that various exemplary modules and algorithm steps described with reference to the embodiments of the present disclosure given herein may be practiced in the form of electronic hardware or a combination of computer software and electronic hardware. Whether such functions are implemented in the form of software or hardware depends on the specific application of the technical solutions and the design restrictions. Professional technical personnels may implement the described functions by using different methods for each specific application. However, such implementation shall not be deemed as going beyond the scope of the present disclosure.

A person skilled in the art would clearly acknowledge that for ease and brevity of description, the specific operation processes of the above described systems, apparatuses and modules may be referenced to the relevant portions in the above described method embodiments, which are thus not described herein any further.

In the several embodiments provided in the present disclosure, it should be understood that the disclosed system, apparatus and method may be practiced in other manners. The above described apparatus embodiments are merely illustrative. For example, the module division is merely logical function division and may be other divisions in actual practice. For example, multiple modules or components may be combined or integrated into another device, or some features can be ignored or not performed. In addition, the displayed or discussed mutual couplings or direct couplings or communication connections may be implemented through some interfaces. The indirect couplings or communication connections between the devices or units may be implemented in electronic, mechanical or other forms.

The units which are described as separate modules may be physically separated or may be not physically separated, and the components which are illustrated as modules may be or may not be physical modules, that is, the components may be located in the same position or may be distributed into a plurality of network modules. Part or all of the modules may be selected according to the actual needs to achieve the objects of the technical solutions of the embodiments.

In addition, functional modules in the embodiments of the present disclosure may be integrated into one processing module, or each of the modules may exist along physically, or two or more modules may be integrated into one module.

In the case that the functions are implemented in a form of a software functional module and sold or used as an independent product, the functions may be stored in a computer readable storage medium. Based on such an understanding, the technical solutions of the present disclosure essentially, or the part contributing to the related art, or all or a part of the technical solutions may be implemented in a form of a software product. The computer software product is stored in a storage medium and includes several instructions to cause a computer device (which may be a personal computer, a server, a network device, or the like) to perform all or some of steps of the methods described in the embodiments of the present disclosure. The storage medium includes various media capable of storing program code, for example, a USB flash disk, a removable hard disk, a ROM, a RAM, a magnetic disk, or an optical disc.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A communication method, comprising:
   establishing a connection with a virtual subscriber identity module (SIM) card server in a first network using a global virtual SIM card of a terminal to acquire a regional virtual SIM card from the virtual SIM card server, wherein the regional virtual SIM card is configured to allow the terminal to access a second network;
   determining whether the global virtual SIM card of the terminal is in conflict;
   updating a count of conflicts in response to determining that the global virtual SIM card of the terminal is in conflict; and
   upon elapse of a wait period, replacing the global virtual SIM card of the terminal with a new one to acquire the regional virtual SIM card, wherein the wait period is determined according to the count of conflicts and an identifier of the terminal.

2. The method according to claim 1, further comprising:
   establishing the connection with the virtual SIM card server in the first network using the new global virtual SIM card of the terminal;
   acquiring the regional virtual SIM card from the virtual SIM card server; and
   accessing the second network using the regional virtual SIM card.

3. The method according to claim 1, wherein the step of determining whether the global virtual SIM card of the terminal is in conflict comprises:
   determining that the global virtual SIM card of the terminal is in conflict in response to a failure to establish the connection with the virtual SIM card server using the global virtual SIM card for consecutive N times and the global virtual SIM card used each time being replaced, wherein N is a conflict threshold.

4. The method according to claim 3, wherein it is determined that establishment of the connection with the virtual SIM card server using the global virtual SIM card fails in response to
   receiving a reject message from the first network or receiving no response message from the first network in due time.

5. The method according to claim 4, wherein the reject message comprises a reject reason, the rejection reason comprising an implicit detach rejection.

6. The method according to claim 1, wherein the wait period is UE_NUM×registration expiration time+RAND (1, the registration expiration time), or (9-UE_NUM)×registration expiration time+RAND (1, the registration expiration time);
   wherein UE_NUM is a mantissa of the identifier of the terminal with a value of an integer from 0 to 9, RAND (1, the registration expiration time) indicates that a random number is taken between 1 and the registration expiration time, and a wait period corresponding to an odd number as the count of conflicts is different from a wait period corresponding to an even number as the count of conflicts.

7. The method according to claim 1, wherein the identifier of the terminal is an international mobile subscriber identity (IMEI) or a serial number (SN) of the terminal.

8. The method according to claim 1, further comprising:
   determining that a duration where an abnormality is present in accessing the second network using the regional virtual SIM card of the terminal exceeds a predetermined time period.

9. A communication apparatus, comprising:
   a regional virtual subscriber identity module (SIM) card acquiring module, configured to establish a connection with a virtual SIM card server in a first network using a global virtual SIM card of a terminal to acquire a regional virtual SIM card from the virtual SIM card server, wherein the regional virtual SIM card is configured to allow the terminal to access a second network;
   a conflict detecting module, configured to determine whether the global virtual SIM card of the terminal is in conflict;
   a count updating module, configured to update a count of conflicts in response to determining that the global virtual SIM card of the terminal is in conflict; and
   a conflict processing module, configured to, upon elapse of a wait period, replace the global virtual SIM card of the terminal with a new one to acquire the regional virtual SIM card, wherein the wait period is determined according to the count of conflicts and an identifier of the terminal.

10. The communication apparatus according to claim 9, wherein the regional virtual SIM card acquiring module is further configured to:
    establish the connection with the virtual SIM card server in the first network using the new global virtual SIM card of the terminal;
    acquire the regional virtual SIM card from the virtual SIM card server; and
    access the second network using the regional virtual SIM card.

11. The communication apparatus according to claim 9, wherein the conflict detecting module is configured to:
    determine that the global virtual SIM card of the terminal is in conflict in response to a failure to establish the connection with the virtual SIM card server using the global virtual SIM card for consecutive N times and the global virtual SIM card used each time being replaced, wherein N is a conflict threshold.

12. The communication apparatus according to claim 11, wherein it is determined that establishment of the connection with the virtual SIM card server using the global virtual SIM card fails in response to:
    receiving a reject message from the first network or receiving no response message from the first network in due time.

13. The communication apparatus according to claim 12, wherein the reject message comprises a reject reason, the rejection reason comprising an implicit detach rejection.

14. The communication apparatus according to claim 13, wherein the wait period is UE_NUM×registration expiration time+RAND (1, the registration expiration time), or (9-UE_NUM)×registration expiration time+RAND (1, the registration expiration time);

wherein UE_NUM is a mantissa of the identifier of the terminal with a value of an integer from 0 to 9, RAND (1, the registration expiration time) indicates that a random number is taken between 1 and the registration expiration time, and a wait period corresponding to an odd number as the count of conflicts is different from a wait period corresponding to an even number as the count of conflicts.

15. The communication apparatus according to claim 9, wherein the identifier of the terminal is an international mobile subscriber identity (IMEI) or a serial number (SN) of the terminal.

16. The communication apparatus according to claim 9, wherein the regional virtual SIM card acquiring module is further configured to:

determine that a duration where an abnormality is present in accessing the second network using the regional virtual SIM card of the terminal exceeds a predetermined time period.

17. A communication apparatus, comprising:

a memory, a processor, and one or more computer programs that are stored in the memory and runnable on the processor; wherein the one or more computer programs, when loaded and run by the processor, cause the processor to perform the method as defined in claim 1.

18. A terminal, comprising: the communication apparatus as defined in claim 9.

\* \* \* \* \*